United States Patent
Deshpande et al.

(10) Patent No.: US 9,544,833 B2
(45) Date of Patent: Jan. 10, 2017

(54) METHOD AND APPARATUS FOR FEMTO CELL DEPLOYMENT USING NEIGHBOR LIST MESSAGES AND ITS USE IN FEMTO CELL SYSTEM SELECTION

(75) Inventors: Manoj M. Deshpande, San Diego, CA (US); Srinivasan Balasubramanian, San Diego, CA (US); Jen Mei Chen, San Diego, CA (US); Young C. Yoon, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 12/415,809

(22) Filed: Mar. 31, 2009

(65) Prior Publication Data

US 2010/0008323 A1   Jan. 14, 2010

Related U.S. Application Data

(60) Provisional application No. 61/080,015, filed on Jul. 11, 2008.

(51) Int. Cl.
*H04W 36/00* (2009.01)
*H04W 48/12* (2009.01)
*H04W 36/04* (2009.01)
*H04W 84/04* (2009.01)

(52) U.S. Cl.
CPC ............. *H04W 48/12* (2013.01); *H04W 36/00* (2013.01); *H04W 36/04* (2013.01); *H04W 84/045* (2013.01)

(58) Field of Classification Search
CPC ...... H04W 36/00; H04W 48/12; H04W 36/04; H04W 84/045

USPC ................ 455/444, 436, 403, 434
See application file for complete search history.

(56) References Cited

U.S. PATENT DOCUMENTS

| | | | |
|---|---|---|---|
| 5,722,072 A | 2/1998 | Crichton et al. | |
| 6,212,382 B1 * | 4/2001 | Watson et al. ................ | 455/444 |
| 7,929,970 B1 * | 4/2011 | Gunasekara et al. ......... | 455/444 |
| 2002/0072352 A1 | 6/2002 | Jana et al. | |
| 2005/0026619 A1 | 2/2005 | Jha | |
| 2007/0097938 A1 * | 5/2007 | Nylander .......... | H04L 29/12066 370/338 |
| 2007/0105568 A1 | 5/2007 | Nylander et al. | |

(Continued)

FOREIGN PATENT DOCUMENTS

| | | | |
|---|---|---|---|
| EP | 0986279 A1 | 3/2000 | |
| GB | 2456572 A * | 7/2009 | ............ H04W 16/12 |

(Continued)

OTHER PUBLICATIONS

Samsung, "Cell Identification for HNB", 3GPP TSG RAN WG2 #62-BIS, R2-083588, Jun. 30-Jul. 4, 2008.*

(Continued)

*Primary Examiner* — Jean Gelin
(74) *Attorney, Agent, or Firm* — Jia J. Wu

(57) ABSTRACT

A femto cell neighbor list message for a wireless communication system that includes the frequencies and pseudonoise offsets reserved for macro cells and femto cells is disclosed. When the user equipment discovers the femto cell, the user equipment can read the Femto Cell Identification Message and present the identification information to the subscriber. In absence of this knowledge, a manual femto cell search must search all frequencies and all pseudonoise offsets resulting in lengthy search times.

67 Claims, 9 Drawing Sheets

(56) References Cited

U.S. PATENT DOCUMENTS

| | | |
|---|---|---|
| 2007/0213067 A1 | 9/2007 | Li et al. |
| 2007/0254620 A1* | 11/2007 | Lindqvist ............... H04W 48/12 455/403 |
| 2008/0085720 A1* | 4/2008 | Hirano et al. ............ 455/452.1 |
| 2008/0108353 A1 | 5/2008 | Lee et al. |
| 2008/0227447 A1 | 9/2008 | Jeong et al. |
| 2008/0267153 A1* | 10/2008 | Mukherjee ............ H04L 63/104 370/338 |
| 2008/0318576 A1* | 12/2008 | So ..................... H04W 36/0066 455/436 |
| 2009/0052395 A1* | 2/2009 | Bao ..................... H04W 48/12 370/331 |
| 2009/0070694 A1* | 3/2009 | Ore ..................... H04W 12/08 715/764 |
| 2009/0093252 A1* | 4/2009 | Czaja et al. ................. 455/436 |
| 2009/0163216 A1* | 6/2009 | Hoang et al. ................ 455/450 |
| 2010/0003986 A1* | 1/2010 | Chen ........................... 455/436 |
| 2010/0260068 A1* | 10/2010 | Bhatt et al. .................. 370/254 |

FOREIGN PATENT DOCUMENTS

| | | |
|---|---|---|
| JP | 2003506960 A | 2/2003 |
| JP | 2004297482 A | 10/2004 |
| JP | 2006094383 A | 4/2006 |
| JP | 2007104496 A | 4/2007 |
| JP | 2008118404 A | 5/2008 |
| JP | 2011525759 A | 9/2011 |
| RU | 2145774 C1 | 2/2000 |
| WO | WO-0111804 A1 | 2/2001 |
| WO | 2007136530 A2 | 11/2007 |
| WO | WO2009026036 A1 | 2/2009 |
| WO | WO-2010003371 A1 | 1/2010 |

OTHER PUBLICATIONS

International Search Report and Written Opinion—PCT/US2009/040397, International Search Authority—European Patent Office—Aug. 14, 2009.
NTT Docomo et al: "Cell ID Assignment for Home Node B" 3GPP Draft; R1-073684 Cell ID Assignment for Home Node B, 3rd Generation Partnership Project (3GPP), Mobile Competence Centre; 650, Route Des Lucioles; F-06921 Sophia-Antipolis Cedex; France, vol. RAN WG1, No. Athens, Greece; 20070815, Aug. 15, 2007, XP050107280 [retrieved on Aug. 15, 2007] p. 2-p. 4.
Taiwan Search Report—TW098112311—TIPO—Aug. 6, 2012.
Claussen H., et al., "An overview of the femtocell concept", Bell Labs Technical Journal, Wiley, CA, US, vol. 1, No. 13, Mar. 21, 2008 (Mar. 21, 2008), pp. 221-245, XP001512256 ISSN: 1089-7089 abstract p. 224, left-hand col.—p. 225, left-hand col. p. 227, paragraphs Auto-Configuration, Downlink, Uplink figure 2.
Huawei, "NCL design for Idle Mode Mobility", 3GPP TSG-RAN WG2#62 R2-082206, Retrieved from internet: URL: http://3gpp.org/ftp/tsg_ran/WG2_RL2/TSGR2_62/Docs/R2-082206.zip>, Apr. 29, 2008, 2 Pages.
3GPP TS 25.331: "3rd Generation Partnership Project, Technical Specification Group Radio Access Network, Radio Resource Control (RRC), Protocol Specification (Release 7)", 3rd Generation Partnership Project (3GPP), Mobile Competence Centre 650, Route Des Lucioles, F-06921 Sophia-Antipolis Cedex France, No. V7.3.0, Dec. 1, 2006 (Dec. 1, 2006), pp. 1-1316, XP050368005.

* cited by examiner

METHOD AND APPARATUS FOR FEMTO CELL DEPLOYMENT USING NEIGHBOR LIST MESSAGES AND ITS USE IN FEMTO CELL SYSTEM SELECTION

CLAIM OF PRIORITY UNDER 35 U.S.C. §119

The present Application for patent claims priority to Provisional Application No. 61/080,015, entitled "Apparatus and Method for Femto Cell Deployment in Neighbor List Messages and its Use in Femto Cell System Selection," filed Jul. 11, 2008, and assigned to the assignee hereof and hereby expressly incorporated by reference herein.

BACKGROUND

I. Field

The present application relates generally to wireless communications, and more specifically to an apparatus and method for inclusion of the femto cells in neighbor list messages and the use of the neighbor list message in femto cell system selection.

II. Background

Wireless communication systems are widely deployed to provide various types of communication (e.g., voice, data, multimedia services, etc.) to multiple users. As the demand for high-rate and multimedia data services rapidly grows, there lies a challenge to implement efficient and robust communication systems with enhanced performance.

Generally, a wireless multiple-access communication system can simultaneously support communication for multiple wireless terminals. In such a system, each terminal can communicate with one or more base stations via transmissions on the forward and reverse links. The forward link (or downlink) refers to the communication link from the base stations to the terminals, and the reverse link (or uplink) refers to the communication link from the terminals to the base stations. This communication link can be established via a single-in-single-out (SISO), multiple-in-signal-out (MISO), or a multiple-in-multiple-out (MIMO) system.

In addition to mobile phone networks currently in place, a new class of small base stations has emerged, which may be installed in a user's home and provide indoor wireless coverage to mobile units using existing broadband Internet connections. Such personal miniature base stations are generally known as access point base stations, or, alternatively, Home Node B (HNB) or femto cells. The coverage area of a femto cell is relatively small and may be overlapped with neighboring wireless systems and other femto cells. Femto cells are also connected to the wireless communication system using an Internet Protocol based transmission system. Typically, such miniature base stations are connected to the Internet and the mobile operator's network via broadband fixed access such as via a DSL router or a cable modem. Alternatively, the femto cells may be connected to use mobile broadband access such as via HSDPA.

Neighboring wireless communication systems may employ one or more radio access technologies on one or more frequencies typically via fixed base stations, also known as macro cells. Furthermore, a system may have one radio access technology overlaying another. For example, portions of a GSM system may be overlapped with WCDMA base stations which may be overlapped with various femto cells. It may be desirable for the user equipment (UE) communicating on the macro cell to handoff to the femto cell system either when idle or while in call without dropping an active call.

In WCDMA technology a common frequency band allows simultaneous communication between a user equipment unit (UE) and plural base stations. Signals occupying the common frequency band are discriminated at the receiving station through spread spectrum CDMA waveform properties based on the use of a high speed, pseudonoise (PN) code. These high speed PN codes are used to modulate signals transmitted from the base stations and the user equipment units (UEs). Transmitter stations using different PN codes (or a PN code offset in time) produce signals that can be separately demodulated at a receiving station. The high speed PN modulation also allows the receiving station to advantageously generate a received signal from a single transmitting station by combining several distinct propagation paths of the transmitted signal. In CDMA, therefore, a user equipment unit (UE) need not switch frequency when handover of a connection is made from one cell to another. As a result, a destination cell can support a connection to a user equipment unit (UE) at the same time the origination cell continues to service the connection. Since the user equipment unit (UE) is always communicating through at least one cell during handover, there is no disruption to the call.

To facilitate such handoff, a UE must periodically search for base stations on alternate frequencies and/or alternate radio access technologies on nearby cells. A list of potential neighboring base stations is transmitted from a base station to a mobile station. This list is commonly referred to as a neighbor list message (NLM). By limiting searches to those base stations on the NLM, a UE can reduce the amount of time required for such searching as well as the battery consumption.

Aside from overlapping coverage areas, femto cells may be deployed on a dedicated frequency spectrum or may share spectrum with macro cells. In a femto cell deployment, a set of pseudo noise (PN) offsets or primary scrambling codes (PSCs) are reserved for the femto cells. In UMTS deployment, PN offsets are sometimes referred to as scrambling codes. The terms "PN offsets" and "scrambling codes" and their singular forms are used interchangeably unless noted otherwise. However, when searching is required on an alternate frequency, the time available for such searching may be limited while an active call is in session. There is therefore a need in the art for deployment of femto cell neighbor list message so that the time available for scanning alternate frequencies is minimized. The distinction between macro cell and femto cell aid UEs in terms of system selection.

SUMMARY

A method and apparatus for femto cell deployment using neighbor list messages and its use in femto cell system selection is disclosed which reduces the number of frequencies to be searched without compromising the reliability of detection.

In one aspect, there is disclosed a method for neighbor list frequency switching in a terminal in a wireless communication system comprising: receiving a neighbor list message, the neighbor list message including femto cell information and macro cell information, the femto cell information including femto cell frequencies, the macro cell information including macro cell frequencies; determining a switching frequency from among the macro cell frequencies and femto cell frequencies; and switching to the switching frequency.

In another aspect, there is disclosed a method for neighbor list frequency switching in a terminal in a wireless communication system comprising: receiving a macro cell neighbor list message, the macro cell neighbor list message including macro cell information, the macro cell information including macro cell frequencies; receiving a femto cell neighbor list message, the femto cell neighbor list message including femto cell information, the femto cell information including femto cell frequencies; determining a switching frequency from among the macro cell frequencies and the femto cell frequencies; and switching to the switching frequency.

In another aspect, there is disclosed wireless communications apparatus, comprising: a memory for receiving a neighbor list message and for storing a set of macro cell neighbors and a set of femto cell neighbors from a received neighbor list message and producing a search result there from; and a processor for selecting a frequency associated with the subset of the search result.

In another aspect, there is disclosed an apparatus for neighbor list frequency switching in a terminal in a wireless communication system, the apparatus comprising: logic for receiving a neighbor list message, the neighbor list message including femto cell information and macro cell information, the femto cell information including femto cell frequencies, the macro cell information including macro cell frequencies; logic for determining a switching frequency from among the macro cell frequencies and femto cell frequencies; and logic for switching to the switching frequency.

In another aspect, there is disclosed an apparatus for neighbor list frequency switching in a terminal in a wireless communication system, the apparatus comprising: means for receiving a neighbor list message, the neighbor list message including femto cell information and macro cell information, the femto cell information including femto cell frequencies, the macro cell information including macro cell frequencies; means for determining a switching frequency from among the macro cell frequencies and femto cell frequencies; and means for switching to the switching frequency.

In another aspect, there is disclosed a computer program product in a wireless communication system for neighbor list frequency switching in a terminal, comprising: a computer-readable medium comprising: a first set of codes for receiving a neighbor list message, the neighbor list message including femto cell information and macro cell information, the femto cell information including femto cell frequencies, the macro cell information including macro cell frequencies; a second set of codes for determining a switching frequency from among the macro cell frequencies and femto cell frequencies; and a third set of codes for switching to the switching frequency.

DETAILED DESCRIPTION

The word "exemplary" is used herein to mean "serving as an example, instance, or illustration." Any embodiment described herein as "exemplary" is not necessarily to be construed as preferred or advantageous over other embodiments. The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art.

Figure 1:
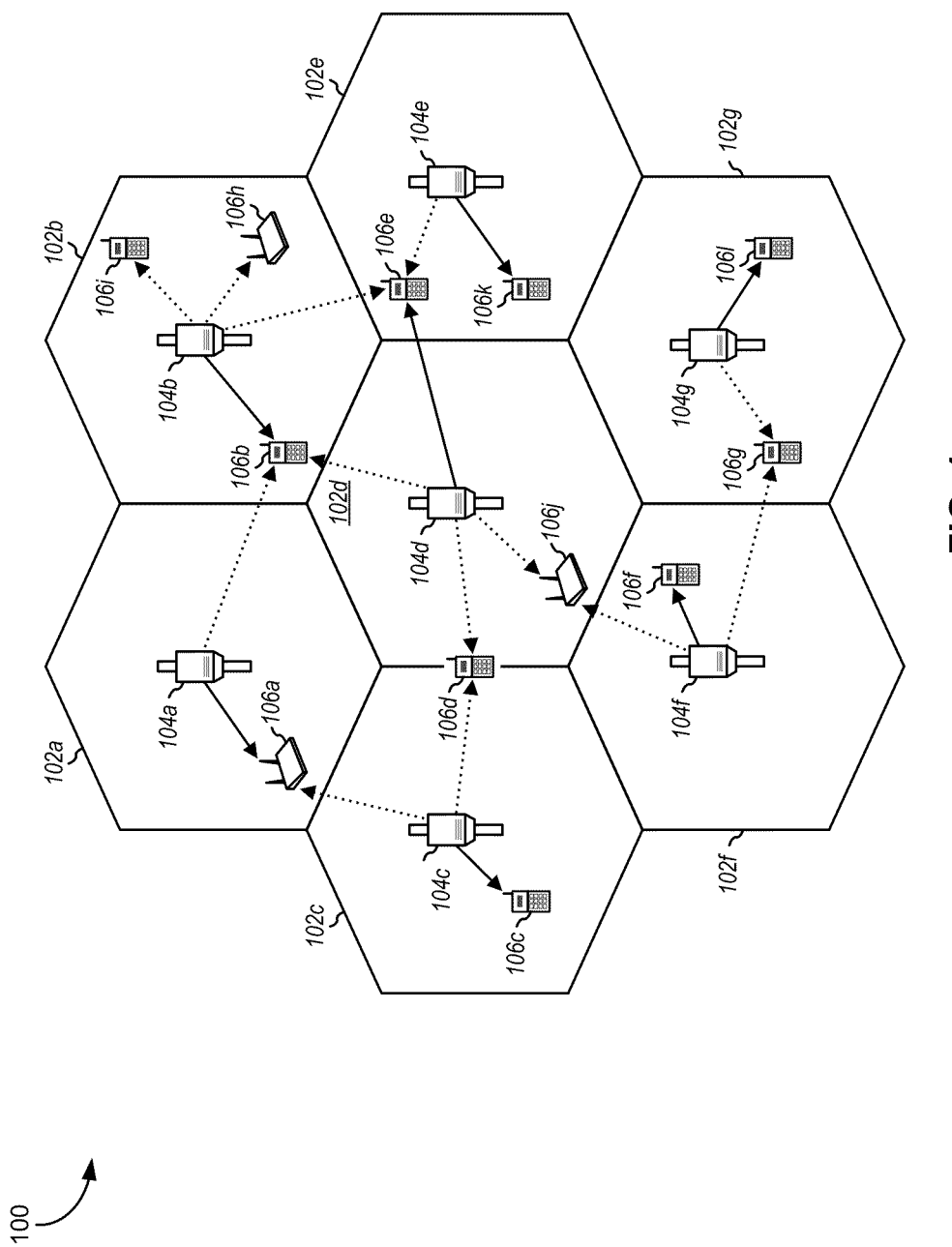
FIG. 1 is a diagram of a multiple access wireless communication system according to one aspect.

FIG. 1 illustrates an exemplary wireless communication system 100 configured to support a number of users, in which various disclosed embodiments and aspects may be implemented. As shown in FIG. 1, by way of example, system 100 provides communication for multiple cells 102, such as, for example, macro cells 102a-102g, with each cell being serviced by a corresponding access point (AP) 104 (such as APs 104a-104g). Each cell may be further divided into one or more sectors. Various access terminals (ATs) 106, including ATs 106a-106k, also known interchangeably as user equipment (UE) or mobile stations, are dispersed throughout the system. Each AT 106 may communicate with one or more APs 104 on a forward link (FL) and/or a reverse link (RL) at a given moment, depending upon whether the AT is active and whether it is in soft handoff, for example. The wireless communication system 100 may provide service over a large geographic region, for example, macro cells 102a-102g may cover a few blocks in a neighborhood.

Figure 2:
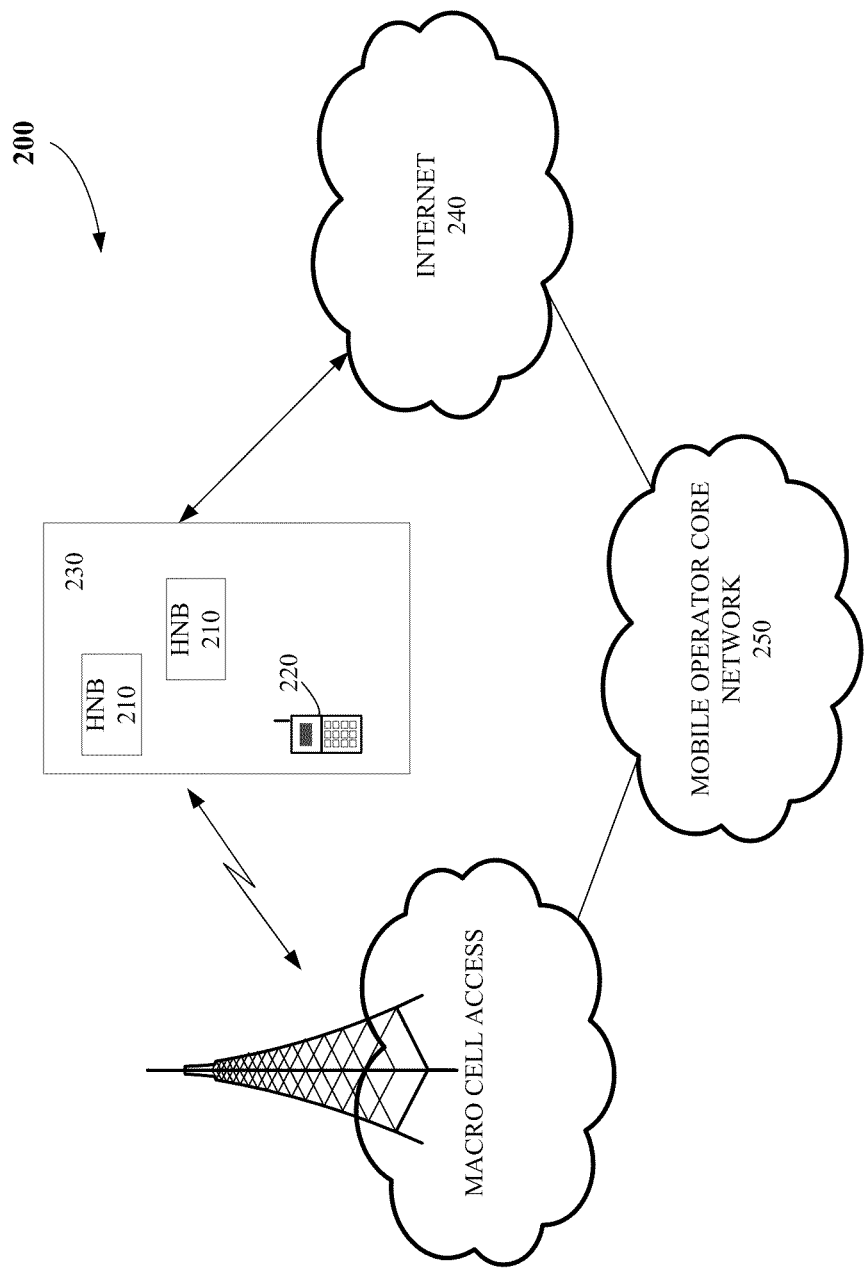
FIG. 2 is a block diagram of a communication system.

FIG. 2 illustrates an exemplary communication system to enable deployment of access point base stations within a network environment. As shown in FIG. 2, the system 200 includes multiple access point base stations or Home Node B units (HNBs) or femto cells, such as, for example, HNBs 210, each being installed in a corresponding small scale network environment, such as, for example, in one or more user residences 230, and being configured to serve associated, as well as alien, user equipment (UE) 220. Each HNB 210 is further coupled to the Internet 240 and a mobile operator core network 250 via a DSL router (not shown) or, alternatively, a cable modem (not shown).

Although embodiments described herein use 3GPP terminology, it is to be understood that the embodiments may be applied to 3GPP (Rel99, Rel5, Rel6, Rel7) technology, as well as 3GPP2 (1xRTT, 1xEV-DO Rel0, RevA, RevB) technology and other known and related technologies. In such embodiments described herein, the owner of the HNB 210 subscribes to mobile service, such as, for example, 3G mobile service, offered through the mobile operator core network 250, and the UE 220 is capable of operating both in macro cellular environment and in residential small scale network environment. Thus, the HNB 210 may be backward compatible with any existing UE 220.

Furthermore, in addition to the macro cell mobile network 250, the UE 220 can only be served by a predetermined number of HNBs 210, namely the HNBs 210 that reside within the user's residence 230, and cannot be in a soft handover state with the macro network 250. The UE 220 can communicate either with the macro network 250 or the HNBs 210, but not both simultaneously. As long as the UE 220 is authorized to communicate with the HNB 210, within the user's residence it is desired that the UE 220 communicate only with the associated HNBs 210.

In an aspect, logical channels are classified into Control Channels and Traffic Channels. Logical Control Channels comprises Broadcast Control Channel (BCCH) which is DL channel for broadcasting system control information. Paging Control Channel (PCCH) which is DL channel that transfers paging information. Multicast Control Channel (MCCH) which is Point-to-multipoint DL channel used for transmitting Multimedia Broadcast and Multicast Service (MBMS) scheduling and control information for one or several MTCHs. Generally, after establishing RRC connection this channel is only used by UEs that receive MBMS (Note: old MCCH+MSCH). Dedicated Control Channel (DCCH) is Point-to-point bi-directional channel that transmits dedicated control information and used by UEs having an RRC connection. In aspect, Logical Traffic Channels comprises a Dedicated Traffic Channel (DTCH) which is Point-to-point bi-directional channel, dedicated to one UE, for the transfer of user information. Also, a Multicast Traffic Channel (MTCH) for Point-to-multipoint DL channel for transmitting traffic data.

In an aspect, Transport Channels are classified into DL and UL. DL Transport Channels comprises a Broadcast Channel (BCH), Downlink Shared Data Channel (DL-SDCH) and a Paging Channel (PCH), the PCH for support of UE power saving (DRX cycle is indicated by the network to the UE), broadcasted over entire cell and mapped to PHY resources which can be used for other control/traffic channels. The UL Transport Channels comprises a Random Access Channel (RACH), a Request Channel (REQCH), a Uplink Shared Data Channel (UL-SDCH) and plurality of PHY channels. The PHY channels comprises a set of DL channels and UL channels.

The DL PHY channels comprises:
Common Pilot Channel (CPICH)
Synchronization Channel (SCH)
Common Control Channel (CCCH)
Shared DL Control Channel (SDCCH)
Multicast Control Channel (MCCH)
Shared UL Assignment Channel (SUACH)
Acknowledgement Channel (ACKCH)
DL Physical Shared Data Channel (DL-PSDCH)
UL Power Control Channel (UPCCH)
Paging Indicator Channel (PICH)
Load Indicator Channel (LICH)

The UL PHY Channels comprises:
Physical Random Access Channel (PRACH)
Channel Quality Indicator Channel (CQICH)
Acknowledgement Channel (ACKCH)
Antenna Subset Indicator Channel (ASICH)
Shared Request Channel (SREQCH)
UL Physical Shared Data Channel (UL-PSDCH)
Broadband Pilot Channel (BPICH)

In an aspect, a channel structure is provided that preserves low PAR (at any given time, the channel is contiguous or uniformly spaced in frequency) properties of a single carrier waveform.

For the purposes of the present document, the following abbreviations apply:

| | |
|---|---|
| AM | Acknowledged Mode |
| AMD | Acknowledged Mode Data |
| ARQ | Automatic Repeat Request |
| BCCH | Broadcast Control CHannel |
| BCH | Broadcast CHannel |
| C- | Control- |
| CCCH | Common Control CHannel |
| CCH | Control CHannel |
| CCTrCH | Coded Composite Transport Channel |
| CP | Cyclic Prefix |
| CRC | Cyclic Redundancy Check |
| CTCH | Common Traffic CHannel |
| DCCH | Dedicated Control CHannel |
| DCH | Dedicated CHannel |
| DL | DownLink |
| DSCH | Downlink Shared CHannel |
| DTCH | Dedicated Traffic CHannel |
| FACH | Forward link Access CHannel |
| FDD | Frequency Division Duplex |
| L1 | Layer 1 (physical layer) |
| L2 | Layer 2 (data link layer) |
| L3 | Layer 3 (network layer) |
| LI | Length Indicator |
| LSB | Least Significant Bit |
| MAC | Medium Access Control |
| MBMS | Multimedia Broadcast Multicast Service |
| MCCH | MBMS point-to-multipoint Control CHannel |
| MRW | Move Receiving Window |
| MSB | Most Significant Bit |
| MSCH | MBMS point-to-multipoint Scheduling CHannel |
| MTCH | MBMS point-to-multipoint Traffic CHannel |
| PCCH | Paging Control CHannel |
| PCH | Paging CHannel |
| PDU | Protocol Data Unit |
| PHY | PHYsical layer |
| PhyCH | Physical CHannels |
| RACH | Random Access CHannel |
| RLC | Radio Link Control |
| RRC | Radio Resource Control |
| SAP | Service Access Point |
| SDU | Service Data Unit |
| SHCCH | SHared channel Control CHannel |
| SN | Sequence Number |
| SUFI | SUper FIeld |
| TCH | Traffic CHannel |
| TDD | Time Division Duplex |
| TFI | Transport Format Indicator |
| TM | Transparent Mode |
| TMD | Transparent Mode Data |
| TTI | Transmission Time Interval |
| U- | User- |
| UE | User Equipment |
| UL | UpLink |
| UM | Unacknowledged Mode |
| UMD | Unacknowledged Mode Data |
| UMTS | Universal Mobile Telecommunications System |
| UTRA | UMTS Terrestrial Radio Access |
| UTRAN | UMTS Terrestrial Radio Access Network |
| MBSFN | multicast broadcast single frequency network |
| MCE | MBMS coordinating entity |
| MCH | multicast channel |
| DL-SCH | downlink shared channel |
| MSCH | MBMS control channel |
| PDCCH | physical downlink control channel |
| PDSCH | physical downlink shared channel |

Generally, ordinary base stations providing macro cell access are installed and configured by operator personnel. As part of the installation, the macro cell base station is manually configured with operational parameters, such as neighbor cell list information. By contrast, a femto cell base station is typically installed by the end user rather than the network operator. The end users are also able to move the femto cell base station geographically from place to place without the wireless communication system operator being able or willing to control relocation of the femto cell base station. End users may additionally create subscriber groups so that access to the femto cell base station is limited to subscribers, family members, or fellow employees. This is because a femto cell end user may choose to limit the access of external users to his own femto cell. Therefore, privately owned femto cells may only accept connections from a Closed Subscribers Group (CSG). Alternatively, the end user may allow any customer from the same mobile network operator as the femto cell to connect to his femto cell. Such access is commonly referred to as an Open Subscriber Group (OSG). Further, a government, regulating authority, or a mobile network operator may seek to limit the use and configuration of femto cells. Limitations may include, but is not limited to, a dedicated frequency spectrum for femto cells, a limit on the number of femto cells co-extensive with a macro cell, a limit on the power consumption of femto cells, etc. Such user-directed relocation and subscription status and governmental regulation requires that, operational parameters such as neighbor cell list information be handled dynamically and automatically.

A neighbor list is a set of cells upon which a user equipment (UE) in idle mode should measure. The neighbor cell list (also known as "neighbor list") is typically included in a broadcast from the radio base station to idle mode user equipment served by the radio base station. An active mode or connected mode user equipment is sent (over a dedicated signaling connection to the user equipment unit) a neighbor list in the form of a neighbor list message. The neighbor list message is a listing of neighbor cells to be used by the user equipment for measurements for a possible handover from the cell. That is, a base station broadcasts information about neighbor cells that a user equipment in idle mode should measure on in order for the UE to determine which cell it should camp on. In the case of an active session, the list of cells of the neighbor list is generally sent to the UE on a dedicated signaling connection and guides the UE as to which cells to perform measurement reporting and to which cell a handover could occur. As used herein, the terms "neighbor cell list" and "neighbor list" are used for both the broadcasted idle mode neighbor cell list and for the active/connected mode neighbor cell list.

Generally, femto cells may be deployed on a dedicated frequency spectrum or may share spectrum with macro cells. In a shared spectrum environment, a set of pseudo noise (PN) offsets are reserved for the femto cells. PN offsets are used, for instance, in a CDMA mobile radio system, as spreading sequences in order to be able to distinguish between different cells and subscribers in the mobile radio network.

A new neighbor list message referred to as a femto cell neighbor list message (FNLM) is proposed. The FNLM will include the channels and the PN offsets used in the femto cell deployment. In an alternative aspect, to support legacy UE which may not support FNLM, the spectrum and the PN offsets used for the femto cell deployment may be included in legacy neighbor list messages such as NLM, extended neighbor list message (ENLM), or general neighbor list message (GNLM) for CDMA2000 networks or SIB11 for UMTS networks.

Existing deployment of neighbor list messages have included femto cell frequencies and PN offsets in the neighbor list messages without discriminating between the cells. That is, the neighbor list message does not indicate whether the neighboring cells are macro cells or femto cells. Although this arrangement helps existing UEs to find femto cells, the existing UEs are not able to distinguish between femto cells and macro cells. Without that knowledge, existing UEs may perform an unnecessary handover between macro cell and femto cell. For instance, a UE traveling at vehicular speed or pedestrian speed will unnecessarily perform handover from macro cell to the femto cell.

The invention proposes a new neighbor list message that includes the frequencies and PN offsets reserved for femto cell deployment. Alternatively, existing neighbor list messages can be updated to include the proposed information.

Currently, a preferred user zone list (PUZL) may provide the priority and characteristics of the user zones to which the UE is subscribed. A PUZL supports conveying channels and PN offsets used in femto cell deployment to a UE, but does not account for different femto cell deployment across different, for example, geographic markets. FNLM offers an alternative whereby a femto cell deployment in geographic market selects the frequencies and PN offsets tuned to the local geographic market is available locally. This flexibility is important for operators.

Figure 3:
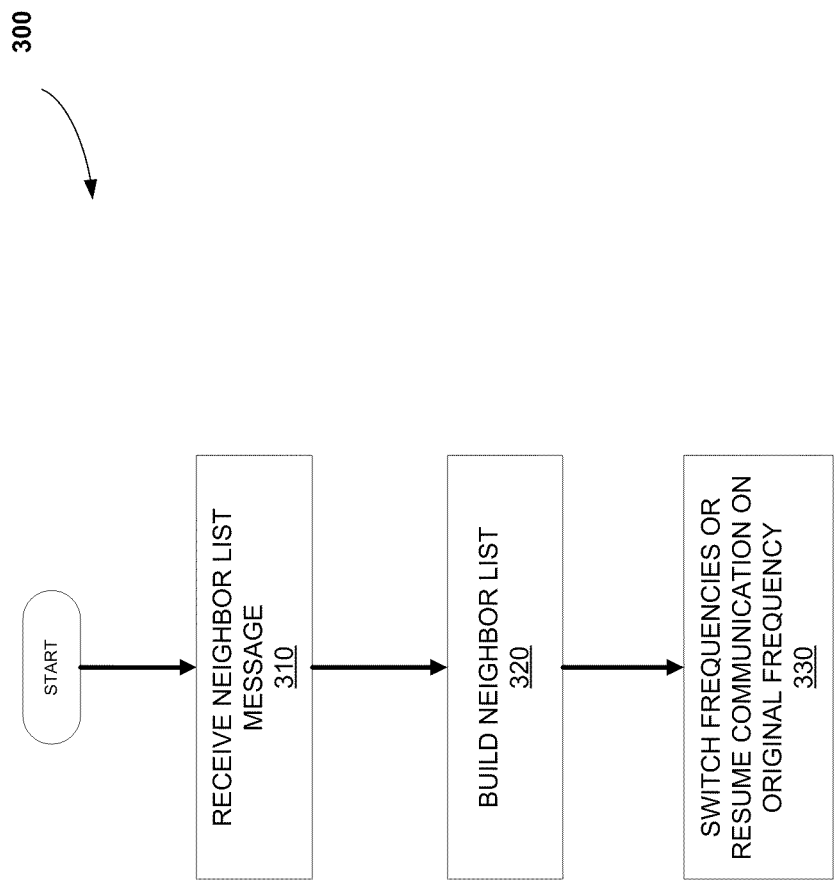
FIG. 3 is a flowchart diagram according to one aspect.

In accordance with one aspect, FIG. 3 illustrates an exemplary method of performing inter-frequency neighbor list searching. At 310, the UE receives a neighbor list message from the base station. The neighbor list message may contain a combined list of potentially available neighboring macro cells and neighboring femto cells. In an exemplary aspect, the macro cell neighbor list may include neighboring macro cells on alternate frequencies as well as alternate radio access technologies. PN offsets may be provided for neighboring macro cells configured to perform CDMA communications.

The neighbor list message additionally contains potentially available neighboring femto cells. In an exemplary aspect, the message includes femto cells on alternate frequencies. Additionally, the message may include PN offsets for neighboring femto cells.

At 320, the UE builds a neighbor list for monitoring. Currently, the neighbor list is limited to thirty macro and femto cells. The neighbor list is a collection of cells that the user equipment unit (UE) is requested (by the network, e.g., by UTRAN) to measure on in order to find candidate cells for handover. Another related concept is called Active Set, which is a collection of cells to which the user equipment unit (UE) has a radio link. Generally, the information to be included in the neighbor list is based on the statically configured neighboring cell lists for the active cell. That is, a base station broadcasts information about neighbor cells that a user equipment unit (UE) in idle mode should measure on in order for the UE to determine which cell it should camp on. In the case of an active session, the list of cells of the neighbor list is transmitted to the UE on a dedicated signaling connection and guides the UE as to which cells to perform measurement reporting and to which cell a handover could occur as commanded by the RNC.

At 330, the UE may switch frequencies or resume communication on the original frequency. The timing and operation of the frequency switching is outside the purview of the present application. For example, the timing of the frequency switching may vary depending on the type of wireless communication system deployed. A system specification may prescribe predetermined intervals during which a mobile station may perform searching on an alternate frequency. In an alternative aspect, a system specification may prescribe signaling to indicate when a UE may switch frequencies without interrupting an active call. In yet another alternative, a UE may make its own determination of when a frequency switch is in order. Such a determination may be made based on predictions of future transmission activity or some other mechanism. The frequency switch in step 330 may be performed during any available time interval during which the UE may safely interrupt monitoring of the current active frequency, as well as transmission on that frequency, to monitor signals transmitted on an alternate frequency.

Figure 4:
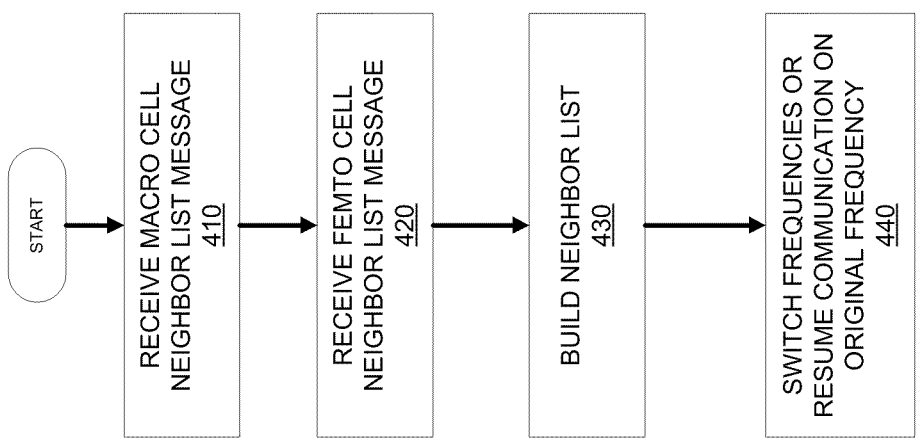
FIG. 4 is a flowchart diagram according to one aspect.

In accordance with another aspect, FIG. 4, illustrates a methodology whereby the neighbor list messages are transmitted to the user equipment as separate messages. One message may contain only neighboring macro cell information. A second subsequent message may contain only neighboring femto cell information. Such a messaging scheme may be particularly advantageous for legacy user equipment which may not be capable of access to femto cells. The legacy user equipment may simply build a neighbor list from the neighboring macro cell information while ignoring the neighboring femto cell information.

At 410, the UE receives a macro cell neighbor list message from the base station. The neighbor list message contains information about potentially available macro cells. In an exemplary embodiment, the macro cell neighbor list may include neighboring macro cells on alternate frequencies as well as alternate radio access technologies. PN offsets may be provided for neighboring macro cells configured to perform CDMA communications.

At 420, the UE receives a femto cell neighbor list message from the base station. The femto cell neighbor list message contains information about potentially available femto cells. In an exemplary embodiment, the femto cell neighbor list may include neighboring macro cells on alternate frequencies as well as alternate radio access technologies. PN offsets may be provided for neighboring femto cells.

At 430, the UE builds a neighbor list for monitoring. The neighbor list is a collection of cells that the user equipment unit (UE) is requested (by the network, e.g., by UTRAN) to measure on in order to find candidate cells for handover. Another related concept is called Active Set, which is a collection of cells to which the user equipment unit (UE) has a radio link. Generally, the information to be included in the neighbor list is based on the statically configured neighboring cell lists for the active cell. That is, a base station broadcasts information about neighbor cells that a user equipment unit (UE) in idle mode should measure on in order for the UE to determine which cell it should camp on. In the case of an active session, the list of cells of the neighbor list is transmitted to the UE on a dedicated signaling connection and guides the UE as to which cells to perform measurement reporting and to which cell a handover could occur as commanded by the RNC.

At 440, the UE may switch frequencies or resume communication on the original frequency. The timing of the frequency switching may vary depending on the type of system deployed. A system specification may prescribe predetermined intervals during which a mobile station may perform searching on an alternate frequency. In an alternative embodiment, a system specification may prescribe signaling to indicate when a UE may switch frequencies without interrupting an active call. In yet another alternative, a UE may make its own determination of when a frequency switch is in order. Such a determination may be made based on predictions of future transmission activity or some other mechanism. The frequency switch in step 440 may be performed during any available time interval during which the UE may safely interrupt monitoring of the current active frequency, as well as transmission on that frequency, to monitor signals transmitted on an alternate frequency.

Figure 5:
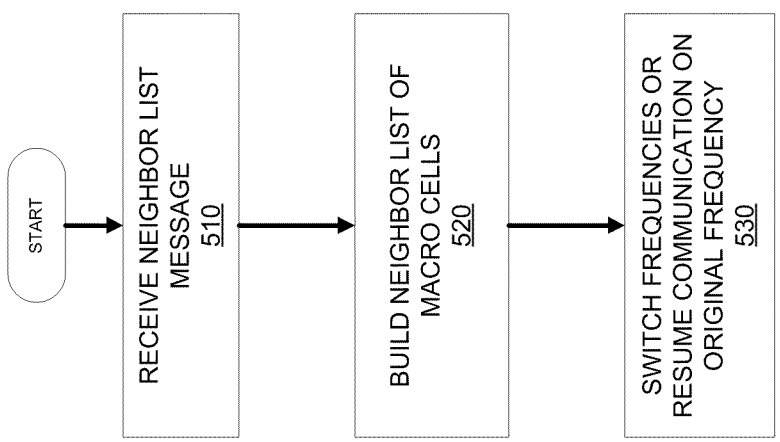
FIG. 5 is a flowchart diagram according to one aspect.

As stated above, the methodology may be different for legacy user equipment (UE) which does not support the use of femto cells. Referring now to FIG. 5, there is illustrated a methodology whereby the neighbor list message may contain a combined list of potentially available neighboring macro cells and neighboring femto cells to legacy user equipment. At 510, the legacy UE receives a neighbor list message from the base station. The neighbor list message may contain a combined list of potentially available neighboring macro cells and neighboring femto cells. In an exemplary aspect, the macro cell neighbor list may include neighboring macro cells on alternate frequencies as well as alternate radio access technologies. PN offsets may be provided for neighboring macro cells configured to perform CDMA communications. The neighbor list message additionally contains potentially available neighboring femto cells. In an exemplary aspect, the message includes femto cells on alternate frequencies. Additionally, the message may include PN offsets for neighboring femto cells.

At 520, the UE builds a neighbor list of macro cells for monitoring. The legacy user equipment may simply build a neighbor list from the neighboring macro cell information while ignoring the neighboring femto cell information. The neighbor list is a collection of cells that the user equipment unit (UE) is requested (by the network, e.g., by UTRAN) to measure on in order to find candidate cells for handover. Generally, the information to be included in the neighbor list is based on the statically configured neighboring cell lists for the active cell. That is, a base station broadcasts information about neighbor cells that a user equipment unit (UE) in idle mode should measure on in order for the UE to determine which cell it should camp on. In the case of an active session, the list of cells of the neighbor list is transmitted to the UE on a dedicated signaling connection and guides the UE as to which cells to perform measurement reporting and to which cell a handover could occur as commanded by the RNC.

At 530, the UE may switch frequencies or resume communication on the original frequency. Since the legacy UE has built a neighbor list from only the neighboring macro cells, the UE has a list of macro cell switching candidates. The timing and operation of the frequency switching is outside the purview of the present application. For example, the timing of the frequency switching may vary depending on the type of wireless communication system deployed. A system specification may prescribe predetermined intervals during which a mobile station may perform searching on an alternate frequency. In an alternative aspect, a system specification may prescribe signaling to indicate when a UE may switch frequencies without interrupting an active call. In yet another alternative, a UE may make its own determination of when a frequency switch is in order. Such a determination may be made based on predictions of future transmission activity or some other mechanism. The frequency switch in step 330 may be performed during any available time interval during which the UE may safely interrupt monitoring of the current active frequency, as well as transmission on that frequency, to monitor signals transmitted on an alternate frequency.

Figure 6:
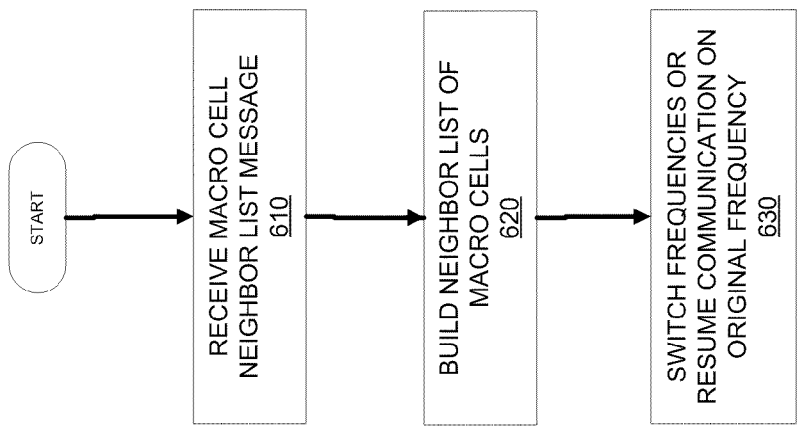
FIG. 6 is a flowchart diagram according to one aspect.

Referring now to FIG. 6, there is illustrated a methodology whereby the neighbor list messages are transmitted to the legacy user equipment as separate messages. One message may contain only neighboring macro cell information. A second subsequent message may contain only neighboring femto cell information. Such a messaging scheme may be particularly advantageous for legacy user equipment which may not be capable of access to femto cells. The legacy user equipment may simply build a neighbor list from the neighboring macro cell information while ignoring the neighboring femto cell information.

At 610, the legacy UE receives a macro cell neighbor list message from the base station. The neighbor list message contains information about potentially available macro cells. In an exemplary embodiment, the macro cell neighbor list may include neighboring macro cells on alternate frequencies as well as alternate radio access technologies. PN offsets may be provided for neighboring macro cells configured to perform CDMA communications.

At 620, the UE builds a neighbor list of macro cells for monitoring. The legacy user equipment may simply build a neighbor list from the neighboring macro cell information while ignoring the neighboring femto cell information. The neighbor list is a collection of cells that the user equipment unit (UE) is requested (by the network, e.g., by UTRAN) to measure on in order to find candidate cells for handover. Generally, the information to be included in the neighbor list is based on the statically configured neighboring cell lists for the active cell. That is, a base station broadcasts information about neighbor cells that a user equipment unit (UE) in idle mode should measure on in order for the UE to determine which cell it should camp on. In the case of an active session, the list of cells of the neighbor list is transmitted to the UE on a dedicated signaling connection and guides the UE as to which cells to perform measurement reporting and to which cell a handover could occur as commanded by the RNC.

At 630, the UE may switch frequencies or resume communication on the original frequency. Since the legacy UE has built a neighbor list from only the neighboring macro cells, the UE has a list of macro cell switching candidates. The timing and operation of the frequency switching is outside the purview of the present application. For example, the timing of the frequency switching may vary depending on the type of wireless communication system deployed. A system specification may prescribe predetermined intervals during which a mobile station may perform searching on an alternate frequency. In an alternative aspect, a system specification may prescribe signaling to indicate when a UE may switch frequencies without interrupting an active call. In yet another alternative, a UE may make its own determination of when a frequency switch is in order. Such a determination may be made based on predictions of future transmission activity or some other mechanism. The frequency switch in step 330 may be performed during any available time interval during which the UE may safely interrupt monitoring of the current active frequency, as well as transmission on that frequency, to monitor signals transmitted on an alternate frequency.

Figure 7:
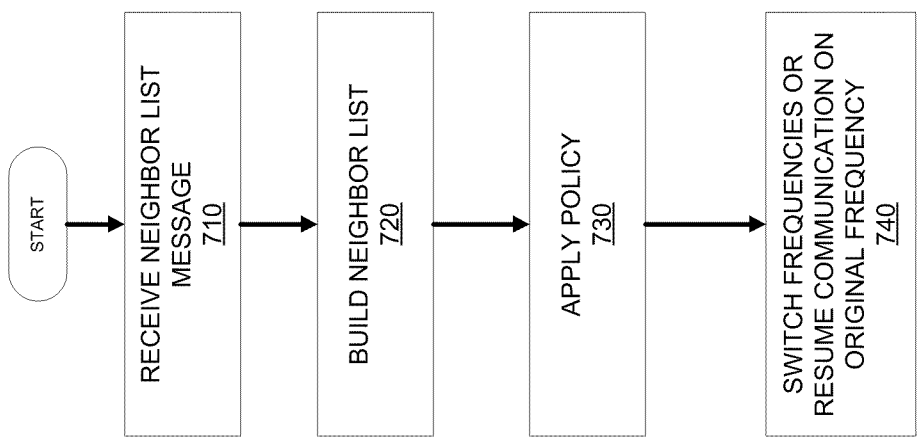
FIG. 7 is a flowchart diagram according to one aspect.

In accordance with another aspect, FIG. 7, illustrates a methodology whereby the neighbor list message is a combination of macro cell and femto cell neighbor list messages. At 710, the UE receives a neighbor list message from the base station. The neighbor list message contains information about potentially available macro cells. In an exemplary embodiment, the macro cell neighbor list may include neighboring macro cells on alternate frequencies as well as alternate radio access technologies. PN offsets may be provided for neighboring macro cells configured to perform CDMA communications.

The neighbor list message additionally contains potentially available neighboring femto cells. In an exemplary aspect, the message includes femto cells on alternate frequencies. Additionally, the message may include PN offsets for neighboring femto cells. In an alternative aspect, the message may also include an indication of whether femto cells are Closed Subscribers Group (CSG) or Open Subscriber Group (OSG).

At 720, the UE builds a neighbor list for monitoring. The neighbor list is a collection of cells that the user equipment unit (UE) is requested (by the network, e.g., by UTRAN) to measure on in order to find candidate cells for handover. Another related concept is called Active Set, which is a collection of cells to which the user equipment unit (UE) has a radio link. Generally, the information to be included in the neighbor list is based on the statically configured neighboring cell lists for the active cell. That is, a base station broadcasts information about neighbor cells that a user equipment unit (UE) in idle mode should measure on in order for the UE to determine which cell it should camp on. In the case of an active session, the list of cells of the neighbor list is transmitted to the UE on a dedicated signaling connection and guides the UE as to which cells to perform measurement reporting and to which cell a handover could occur as commanded by the RNC. In accordance with an alternative aspect, the UE checks to see whether the UE is a subscriber to a Closed Subscriber Group femto cell before adding that particular femto cell to the neighbor list. In accordance with an alternative aspect, the UE checks to see whether the UE is engaged in high speed motion. In that case, the UE builds a neighbor list comprising only the neighboring macro cells.

At 730, the switching policy is applied. The timing and operation of the switching policy is outside the purview of the present application. For example, the timing of the frequency switching may vary depending on the type of wireless communication system deployed. A system specification may prescribe predetermined intervals during which a mobile station may perform searching on an alternate frequency. In an alternative aspect, a system specification may prescribe signaling to indicate when a UE may switch frequencies without interrupting an active call. In yet another alternative, a UE may make its own determination of when a frequency switch is in order. Such a determination may be made based on predictions of future transmission activity or some other mechanism. The frequency switch in step 740 may be performed during any available time interval during which the UE may safely interrupt monitoring of the current active frequency, as well as transmission on that frequency, to monitor signals transmitted on an alternate frequency. At 740, the UE may switch frequencies or resume communication on the original frequency.

Figure 8:
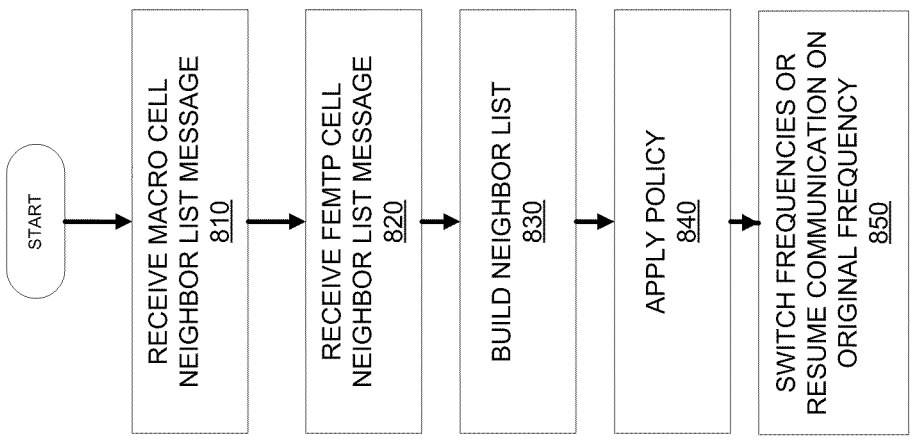
FIG. 8 is a flowchart diagram according to one aspect.

In accordance with another aspect, FIG. 8 illustrates a methodology whereby the neighbor list messages are transmitted to the legacy user equipment as separate messages. One message may contain only neighboring macro cell information. A second subsequent message may contain only neighboring femto cell information.

At 810, the legacy UE receives a macro cell neighbor list message from the base station. The neighbor list message contains information about potentially available macro cells. In an exemplary embodiment, the macro cell neighbor list may include neighboring macro cells on alternate frequencies as well as alternate radio access technologies. PN offsets may be provided for neighboring macro cells configured to perform CDMA communications. At 820, the legacy UE receives a femto cell neighbor list message from the base station.

At 830, the UE builds a neighbor list of macro cells for monitoring. The legacy user equipment may simply build a neighbor list from the neighboring macro cell information while ignoring the neighboring femto cell information. The neighbor list is a collection of cells that the user equipment unit (UE) is requested (by the network, e.g., by UTRAN) to measure on in order to find candidate cells for handover. Generally, the information to be included in the neighbor list is based on the statically configured neighboring cell lists for the active cell. That is, a base station broadcasts information about neighbor cells that a user equipment unit (UE) in idle mode should measure on in order for the UE to determine which cell it should camp on. In the case of an active session, the list of cells of the neighbor list is transmitted to the UE on a dedicated signaling connection and guides the UE as to which cells to perform measurement reporting and to which cell a handover could occur as commanded by the RNC. In accordance with an alternative aspect, the UE checks to see whether the UE is a subscriber to a Closed Subscriber Group femto cell before adding that particular femto cell to the neighbor list. In accordance with an alternative aspect, the UE checks to see whether the UE is engaged in high speed motion. In that case, the UE builds a neighbor list comprising only the neighboring macro cells.

At 840, the switching policy is applied. The timing and operation of the switching policy is outside the purview of the present application. For example, the timing of the frequency switching may vary depending on the type of wireless communication system deployed. A system specification may prescribe predetermined intervals during which a mobile station may perform searching on an alternate frequency. In an alternative aspect, a system specification may prescribe signaling to indicate when a UE may switch frequencies without interrupting an active call. In yet another alternative, a UE may make its own determination of when a frequency switch is in order. Such a determination may be made based on predictions of future transmission activity or some other mechanism. The frequency switch in step 850 may be performed during any available time interval during which the UE may safely interrupt monitoring of the current active frequency, as well as transmission on that frequency, to monitor signals transmitted on an alternate frequency. At 850, the UE may switch frequencies or resume communication on the original frequency.

Knowledge of frequencies and PN offsets allocated to femto cells helps UE in system selection and improves the standby time in several ways as follows. First, using FNLM, a UE can determine when it is in the coverage of a femto cell and apply new system selection procedures to delay idle handoff. This delay avoids the ping-pong registrations. Second, FNLM can help a UE that is travelling at vehicular speed to eliminate the femto cell search and concentrate on a macro cell search. Third, FNLM can help a UE that does not subscribe to any femto cell to avoid selecting the femto cell. Such avoidance can be useful where majority of the femto cells support signaling association rather than open association. Fourth, the knowledge of the frequencies and PN offsets allocated to femto cells is useful for efficient manual search of femto cells. With that knowledge, a UE can limit its femto cell search for specific frequencies and PN offsets.

When the UE discovers the femto cell, a UE can read the Femto Cell Identification Message and present the identification information to the subscriber. In absence of this knowledge, a manual femto cell search must search all frequencies and all PN offsets. Further, for all discovered cells (macro cells or femto cells), a UE must read the overhead messages while looking for the Femto Cell Identification Message. In the absence of FNLM, with cellular and PCS deployment and with over thirty pilots visible, the manual scan is expected to take a considerable duration.

Although current standard supports inclusion of up to 40 neighbors in the legacy neighbor list message, some existing implementations limit the size of the neighbor lists to as few as 20 neighbors. This limited capacity limits the number of femto cell neighbors that can be included in legacy neighbor list messages. Introduction of FNLM will overcome this limitation in future where femto cell subscription may be limited to UEs which can recognize and enable femto cells.

Figure 9:
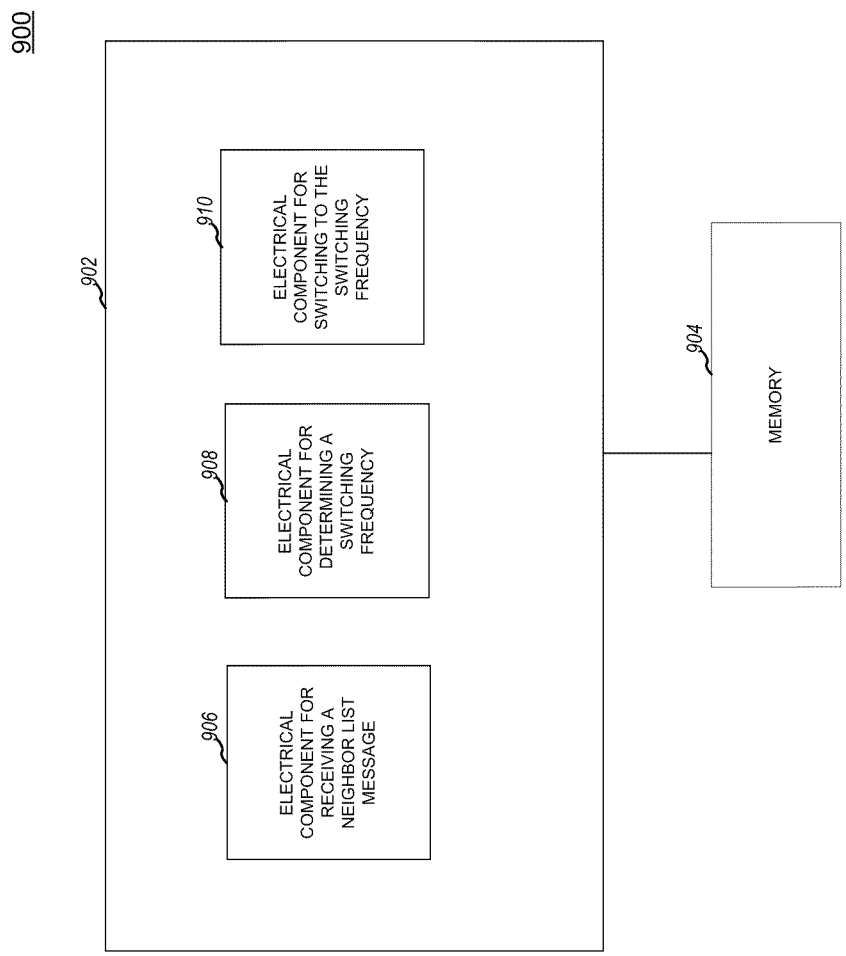
FIG. 9 is a block diagram of an illustrative system according to one aspect.

FIG. 9 illustrates an example system 900 for neighbor list frequency switching in a wireless network. The system 900 can reside at least partially within a mobile device and is represented as including functional blocks, which may be functional blocks that represent functions implemented by a processor, hardware, software, or combination thereof (e.g. firmware).

Included in system 900 is a logical grouping 902 of electrical components that can act separately or in conjunction. Logical grouping 902 includes an electrical component 906 for receiving a neighbor list message. The neighbor list message is a listing of neighbor cells to be used by the user equipment for measurements for a possible handover from the cell. Further, the system 900 includes an electrical component 908 for determining a switching frequency. Also included is an electrical component 910 for switching to the selected frequency.

Additionally, system 900 can include a memory 904 that retains instructions for executing functions associated with electrical components 906, 908, and 910 or other components. While shown as being external to memory 904, it is to be understood that one or more of electrical components can exist within memory 904.

Variations and modifications to this specific design may be made, and this is within the scope of the invention. Also for clarity, various aspects of the frequency search design have been specifically described for a TIA-1121 (UMB) system. However, the frequency search design described herein may also be used for other CDMA systems, such as cdma2000 and W-CDMA systems, and for other wireless communication systems.

As mentioned previously, the foregoing principle/method can also be applied for other radio technologies. The technology has particular relevance of the aforementioned and conveniently described system and scenarios, but could also be applied in other cases and for other networks.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for neighbor list frequency switching in a terminal in a wireless communication system comprising:
receiving a broadcast neighbor list message, the broadcast neighbor list message including femto cell information and macro cell information, the femto cell information including a spectrum of dedicated femto cell frequencies reserved for closed subscriber group (CSG) femto cell deployments, the macro cell information including macro cell frequencies;
determining a switching frequency from among the macro cell frequencies and the femto cell frequencies; and
switching to the switching frequency.

2. The method of claim 1, wherein the femto cell information further includes femto cell pseudo noise (PN) offsets.

3. The method of claim 1, wherein the macro cell information further includes macro cell pseudo noise (PN) offsets.

4. The method of claim 1, wherein the terminal is camped on a serving cell, and wherein the neighbor list is used by the terminal for a possible handover from the serving cell.

5. The method of claim 1, wherein the terminal is active on a serving cell, and wherein the neighbor list is used by the terminal for a possible handover from the serving cell.

6. The method of claim 1, further comprising:
determining if the terminal is a subscriber of the CSG femto cell deployment included in the broadcast neighbor list message.

7. The method of claim 6, further comprising:
if the terminal is not the subscriber of the CSG femto cell deployment, determining the switching frequency from among the macro cell frequencies.

8. The method of claim 1, wherein the femto cell information further includes femto cell frequencies reserved for an open subscriber group (OSG) femto cell deployment.

9. The method of claim 1, further comprising:
determining if the terminal is traveling; and
excluding the femto cell frequencies from the neighbor list in response to a determination that the terminal is traveling.

10. The method of claim 1, further comprising:
determining if the terminal is not configured to access femto cells; and
excluding the femto cell frequencies from the neighbor list in response to a determination that the terminal is not configured to access femto cells.

11. The method of claim 1, wherein the femto cell frequencies reserved are tuned to a local geographic market associated with the femto cell deployment.

12. The method of claim 1, wherein the receiving of the broadcast neighbor list comprises:
receiving the broadcast neighbor list message while in an idle mode.

13. A method for neighbor list frequency switching in a terminal in a wireless communication system comprising:
receiving a macro cell neighbor list message, the macro cell neighbor list message including macro cell information, the macro cell information including macro cell frequencies;
receiving a broadcast femto cell neighbor list message from a base station in the wireless communication system, the broadcast femto cell neighbor list message including femto cell information, the femto cell information including a spectrum of dedicated femto cell frequencies reserved for closed subscriber group (CSG) femto cell deployments;
determining a switching frequency from among the macro cell frequencies and the femto cell frequencies; and
switching to the switching frequency.

14. The method of claim 13, wherein the femto cell information further includes femto cell pseudo noise (PN) offsets.

15. The method of claim 13, wherein the macro cell information further includes macro cell pseudo noise (PN) offsets.

16. The method of claim 13, wherein the terminal is camped on a serving cell, and wherein the neighbor list is used by the terminal for a possible handover from the serving cell.

17. The method of claim 13, wherein the terminal is active on a serving cell, and wherein the neighbor list is used by the terminal for a possible handover from the serving cell.

18. The method of claim 13, further comprising:
determining if the terminal is a subscriber of the CSG femto cell deployment included in the broadcast femto cell neighbor list message.

19. The method of claim 18, further comprising:
if the terminal is not the subscriber of the CSG femto cell deployment, determining the switching frequency from among the macro cell frequencies.

20. The method of claim 13, wherein the femto cell information further includes femto cell frequencies reserved for an open subscriber group (OSG) femto cell deployment.

21. The method of claim 13, further comprising:
determining if the terminal is traveling; and
excluding the femto cell frequencies from the neighbor list in response to a determination that the terminal is traveling, determining the switching frequency from among the macro cell frequencies.

22. The method of claim 13, further comprising:
determining if the terminal is not configured to access femto cells; and
excluding the femto cell frequencies from the neighbor list in response to a determination that the terminal is not configured to access femto cells.

23. A wireless communications apparatus for neighbor list frequency switching in a terminal in a wireless communication system, comprising:
at least one processor; and
at least one memory coupled to the at least one processor, the at least one processor and the at least one memory being configured to:
receive a broadcast neighbor list message, the broadcast neighbor list message including femto cell information and macro cell information, the femto cell information including a spectrum of dedicated femto cell frequencies reserved for subscriber group (CSG) femto cell deployments, the macro cell information including macro cell frequencies;
determine a switching frequency from among the macro cell frequencies and the femto cell frequencies; and
switch to the switching frequency.

24. The wireless communications apparatus of claim 23, wherein the femto cell information further includes femto cell pseudo noise (PN) offsets.

25. The wireless communications apparatus of claim 23, wherein the macro cell information further includes macro cell pseudo noise (PN) offsets.

26. The wireless communications apparatus of claim 23, wherein the terminal is camped on a serving cell, and wherein the neighbor list is used by the terminal for a possible handover from the serving cell.

27. The wireless communications apparatus of claim 23, wherein the terminal is active on a serving cell, and wherein the terminal is configured to use the neighbor list for a possible handover from the serving cell.

28. The wireless communications apparatus of claim 23, wherein the at least one processor and the at least one memory are further configured to:
determine if the wireless communications apparatus is a subscriber of the CSG femto cell deployment included in the broadcast neighbor list message.

29. The wireless communications apparatus of claim 28, wherein the at least one processor and the at least one memory are further configured to determine the switching frequency from among the macro cell frequencies if the wireless communications apparatus is not the subscriber of the CSG femto cell deployment.

30. The wireless communications apparatus of claim 23, wherein the femto cell information further includes femto cell frequencies reserved for an open subscriber group (OSG) femto cell deployment.

31. The wireless communications apparatus of claim 23, wherein the at least one processor and the at least one memory are is further configured to:
determine if the wireless communications apparatus is traveling; and
exclude the femto cell frequencies from the neighbor list in response to a determination that the terminal is traveling.

32. The wireless communications apparatus of claim 23, wherein the at least one processor and the at least one memory are is further configured to:
determine if the wireless communications apparatus is not configured to access femto cells; and
exclude the femto cell frequencies from the neighbor list in response to a determination that the terminal is not configured to access femto cells.

33. An apparatus for neighbor list frequency switching in a terminal in a wireless communication system, the apparatus comprising:
logic for receiving a broadcast neighbor list message, the broadcast neighbor list message including femto cell information and macro cell information, the femto cell information including a spectrum of dedicated femto cell frequencies reserved for closed subscriber group (CSG) femto cell deployments, the macro cell information including macro cell frequencies;
logic for determining a switching frequency from among the macro cell frequencies and the femto cell frequencies; and
logic for switching to the switching frequency;
wherein the logic for receiving, determining, and switching includes hardware.

34. The apparatus of claim 33, wherein the femto cell information further includes femto cell pseudo noise (PN) offsets.

35. The apparatus of claim 33, wherein the macro cell information further includes macro cell pseudo noise (PN) offsets.

36. The apparatus of claim 33, wherein the terminal is camped on a serving cell, and wherein the neighbor list is used by the terminal for a possible handover from the serving cell.

37. The apparatus of claim 33, wherein the terminal is active on a serving cell, and wherein the neighbor list is used by the terminal for a possible handover from the serving cell.

38. The apparatus of claim 33, further comprising:
logic for determining if the terminal is a subscriber of the CSG femto cell deployment included in the broadcast neighbor list message.

39. The apparatus of claim 38, further comprising:
logic for determining the switching frequency from among the macro cell frequencies if the terminal is not the subscriber of the CSG femto cell deployment.

40. The apparatus of claim 33, wherein the femto cell information further includes femto cell frequencies reserved for an open subscriber group (OSG) femto cell deployment.

41. The apparatus of claim 33, further comprising:
logic for determining if the terminal is traveling; and
logic for excluding the femto cell frequencies from the neighbor list in response to a determination that the terminal is traveling.

42. The apparatus of claim 33, further comprising:
logic for determining if the terminal is not configured to access femto cells; and
logic for excluding the femto cell frequencies from the neighbor list in response to a determination that the terminal is not configured to access femto cells.

43. An apparatus for neighbor list frequency switching in a terminal in a wireless communication system, the apparatus comprising:
means for receiving a broadcast neighbor list message, the broadcast neighbor list message including femto cell information and macro cell information, the femto cell information including a spectrum of dedicated femto cell frequencies reserved for closed subscriber group (CSG) femto cell deployments, the macro cell information including macro cell frequencies;
means for determining a switching frequency from among the macro cell frequencies and the femto cell frequencies; and
means for switching to the switching frequency.

44. The apparatus of claim 43, wherein the femto cell information further includes femto cell pseudo noise (PN) offsets.

45. The apparatus of claim 43, wherein the macro cell information further includes macro cell pseudo noise (PN) offsets.

46. The apparatus of claim 43, wherein the terminal is camped on a serving cell, and wherein the neighbor list is used by the terminal for a possible handover from the serving cell.

47. The apparatus of claim 43, wherein the terminal is active on a serving cell, and wherein the neighbor list is used by the terminal for a possible handover from the serving cell.

48. The apparatus of claim 43, further comprising:
means for determining if the terminal is a subscriber of the CSG femto cell deployment included in the broadcast neighbor list message.

49. The apparatus of claim 48, further comprising:
means for determining the switching frequency from among the macro cell frequencies if the terminal is not the subscriber of the CSG femto cell deployment.

50. The apparatus of claim 43, wherein the femto cell information further includes femto cell frequencies reserved for an open subscriber group (OSG) femto cell deployment.

51. The apparatus of claim 43, further comprising:
means for determining if the terminal is traveling; and
means for excluding the femto cell frequencies from the neighbor list in response to a determination that the terminal is traveling.

52. A non-transitory computer-readable medium in a wireless communication system for neighbor list frequency switching in a terminal, comprising:
a first set of codes for receiving a broadcast neighbor list message, the broadcast neighbor list message including femto cell information and macro cell information, the femto cell information including a spectrum of dedicated femto cell frequencies reserved for closed subscriber group (CSG) femto cell deployments, the macro cell information including macro cell frequencies;
a second set of codes for determining a switching frequency from among the macro cell frequencies and the femto cell frequencies; and
a third set of codes for switching to the switching frequency.

53. The non-transitory computer-readable medium of claim 52, wherein the femto cell information further includes femto cell pseudo noise (PN) offsets.

54. The non-transitory computer-readable medium of claim 52, wherein the macro cell information further includes macro cell pseudo noise (PN) offsets.

55. The non-transitory computer-readable medium of claim 52, wherein the terminal is camped on a serving cell, and wherein the neighbor list is used by the terminal for a possible handover from the serving cell.

56. The non-transitory computer-readable medium of claim 52, wherein the terminal is active on a serving cell, and wherein the neighbor list is used by the terminal for a possible handover from the serving cell.

57. The non-transitory computer-readable medium of claim 52, further comprising:
a fourth set of codes for determining if the terminal is a subscriber of the CSG femto cell deployment included in the broadcast neighbor list message.

58. The non-transitory computer-readable medium of claim 57, further comprising:
a fifth set of codes for determining the switching frequency from among the macro cell frequencies if the terminal is not the subscriber of the CSG femto cell deployment.

59. The non-transitory computer-readable medium of claim 52, wherein the femto cell information further includes femto cell frequencies reserved for an open subscriber group (OSG) femto cell deployment.

60. The non-transitory computer-readable medium of claim 52, further comprising:
a sixth set of codes for determining if the terminal is traveling; and
a seventh set of codes for excluding the femto cell frequencies from the neighbor list in response to a determination that the terminal is traveling.

61. A method for a radio base station to facilitate neighbor list frequency switching in a terminal in a wireless communication system comprising:
identifying femto cell information for one or more neighboring femto cells, the femto cell information including a spectrum of dedicated femto cell frequencies reserved for closed subscriber group (CSG) femto cell deployments;
identifying macro cell information for one or more neighboring macro cells, the macro cell information including macro cell frequencies;
building a neighbor list message that includes the femto cell information and the macro cell information; and
broadcasting the neighbor list message to one or more terminals served by the radio base station.

62. The method of claim 61, wherein the femto cell information further includes femto cell pseudo noise (PN) offsets.

63. A method for a radio base station to facilitate neighbor list frequency switching in a terminal in a wireless communication system comprising:
identifying femto cell information for one or more neighboring femto cells, the femto cell information including a spectrum of dedicated femto cell frequencies reserved for closed subscriber group (CSG) femto cell deployments;

identifying macro cell information for one or more neighboring macro cells, the macro cell information including macro cell frequencies;

building a femto cell neighbor list message that includes the femto cell information;

building a macro cell neighbor list message that includes the macro cell information; and broadcasting the femto cell neighbor list message and the macro cell neighbor list message to one or more terminals served by the radio base station.

64. The method of claim 63, wherein the femto cell information further includes femto cell pseudo noise (PN) offsets.

65. A method for neighbor list frequency switching in a terminal in a wireless communication system comprising:

receiving a broadcast neighbor list message, the broadcast neighbor list message including femto cell information and macro cell information, the femto cell information including a spectrum of dedicated femto cell frequencies reserved for femto cell deployments, the macro cell information including macro cell frequencies;

determining a switching frequency from among the macro cell frequencies and the femto cell frequencies; and switching to the switching frequency.

66. The method of claim 65, further comprising:

determining if the terminal is traveling; and excluding the femto cell frequencies from the neighbor list in response to a determination that the terminal is traveling.

67. The method of claim 65, further comprising:

determining if the terminal is not configured to access femto cells; and excluding the femto cell frequencies from the neighbor list in response to a determination that the terminal is not configured to access femto cells.

* * * * *